(12) United States Patent
Hiraka et al.

(10) Patent No.: US 7,240,518 B2
(45) Date of Patent: Jul. 10, 2007

(54) PROCESS FOR PRODUCING SPHERICAL GLASS

(75) Inventors: Masahiro Hiraka, Nara (JP); Shigeo Furukawa, Osaka (JP); Mitsuhiro Fujita, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 608 days.

(21) Appl. No.: 10/477,152

(22) PCT Filed: Dec. 25, 2002

(86) PCT No.: PCT/JP02/13543

§ 371 (c)(1),
(2), (4) Date: Nov. 7, 2003

(87) PCT Pub. No.: WO03/055812

PCT Pub. Date: Jul. 10, 2003

(65) Prior Publication Data

US 2004/0168473 A1    Sep. 2, 2004

(30) Foreign Application Priority Data

Dec. 26, 2001  (JP) ............................ 2001-393427
Dec. 26, 2001  (JP) ............................ 2001-393428
Jun. 12, 2002  (JP) ............................ 2002-170883

(51) Int. Cl.
*C03B 19/10*  (2006.01)
*C03C 3/00*   (2006.01)

(52) U.S. Cl. ........................... 65/21.3; 65/32.5; 65/65; 65/66

(58) Field of Classification Search ................ 65/21.2, 65/21.3, 32.5, 64, 66, 116, 126, 137, 142; 264/5, 13, 14

See application file for complete search history.

(56) References Cited

U.S. PATENT DOCUMENTS 3,843,340 A   10/1974   Cone
4,002,446 A    1/1977   Hammel et al.

(Continued)

FOREIGN PATENT DOCUMENTS

GB          1115174 A      5/1968

(Continued)

OTHER PUBLICATIONS

Japanese International Search Report for PCT/JP02/13543, dated Apr. 22, 2003.

*Primary Examiner*—Carlos Lopez
(74) *Attorney, Agent, or Firm*—RatnerPrestia

(57) ABSTRACT

The apparatus for producing glass beads of the present invention comprises a melting pot 2 for heating and melting glass, a nozzle 2A for dripping molten glass 4 in the melting pot 2, which is disposed at the bottom of the melting pot 2, and a liquid glass droplet receiver 11 filled with cooling solution 150 for cooling the liquid glass droplet 10 dripped from the nozzle 2A, which is disposed under the nozzle 2A, wherein the cooling solution 150 is made from a material that forms a bubble layer around the liquid glass droplet 10 as the cooling solution 150 is vaporized due to the heat of the liquid glass droplet 10 during a period when the liquid glass droplet 10 is cooled down to a temperature lower than the glass transfer temperature in the cooling solution 150.

23 Claims, 11 Drawing Sheets

U.S. PATENT DOCUMENTS 4,344,787 A * 8/1982 Beggs et al. .................. 65/21.4
2003/0131628 A1 * 7/2003 Murakami et al. ........... 65/21.2

FOREIGN PATENT DOCUMENTS

| JP | 01-119522 A | 5/1989 |
| JP | 02-014839 A | 1/1990 |
| JP | 03-223122 A | 10/1991 |
| JP | 07-041328 A | 2/1995 |
| JP | 10-291824 A | 11/1998 |
| JP | 2003104744 A * | 4/2003 |
| SU | 530854 A | 12/1976 |

* cited by examiner

PROCESS FOR PRODUCING SPHERICAL GLASS

This application is a U.S. National Phase Application of PCT International Application PCT/JP02/13543.

TECHNICAL FIELD

The present invention relates to a method and apparatus for producing glass beads, particularly to a method for producing glass beads as preform material used for manufacturing optical lenses by press-forming.

BACKGROUND ART

Recently, not only optical equipment and digital cameras but cellular phones and other devices are equipped with cameras, and there is an increasing demand for low-cost lenses which are smaller in size and higher in performance. As a method for manufacturing such lenses, a hot mold press-forming method for preform material is widely employed in place of a conventional glass sheet polishing method. In this manufacturing method, a lens is formed by hot press-forming after arranging glass beads, preform material, between metal molds having same curved surfaces as those of the lens. In this case, for increasing the shape accuracy of the lens to be finally formed, it is desirable that the glass beads, preform material, be as spherical as possible and free from defects such as internal bubbling. The reasons for this are as follows. Namely, when glass beads are excellent in sphericity, no bias load will be applied to the glass beads in the initial state of pressing in metal molds, and as a result, it is possible to enhance the accuracy of the lens formed by press-forming.

As a method for producing such glass beads as preform material, available is a method of grinding and polishing glass into spheres. However, in the glass grinding and polishing method, there is a great loss of glass material, and also, much time is required for producing glass beads and it is unable to improve the productivity.

Accordingly, in the Japanese Laid-open Patent H2-14839, disclosed is a method for producing glass beads in which glass is melted in a platinum pot, and the molten glass is dripped into air from a platinum nozzle connected to the pot, and the dripped molten glass is cooled in a state of being floated by a flow of air jetted above the receiving mold provided with an air jetting orifice at the bottom thereof. Also, in the Japanese Laid-open Patent H10-291824, disclosed is a method of cooling and hardening drops of molten glass thrown into a solution having cleaning effects. In this method, alcohol or a mixture of alcohol and water is used as the solution, and it is disclosed that glass beads with excellent sphericity can be manufactured while shortening the dripping distance.

However, in the case of producing a glass bead by cooling while making it floated in air, it is relatively difficult to cool a drop of molten glass in a state of being precisely floated by air flow. As a result, the drop of molten glass may sometimes come into direct contact with the inner surface of the receiving mold. In that case, there arises a problem such that the drop of molten glass hardens as it is deformed or strained. Further, when a plurality of drops of molten glass are dripped into same receiving mold, the drops of molten glass come into contact with each other to be broken, cracked or hardened, and it is necessary to take out the glass beads before dripping the next molten glass. Accordingly, there is a problem of poor productivity.

Also, in the method of producing glass beads by cooling drops of molten glass thrown into alcohol or the mixture of alcohol and water, defects such as breaking of glass beads and vacuum bubbling are liable to take place, and the yield as preform material cannot be improved, and it is relatively difficult to manufacture highly accurate lenses at low costs.

DISCLOSURE OF THE INVENTION

The present invention is intended to solve the above problems, and the purpose of the invention is to provide a producing method and apparatus for glass beads used as preform material for forming lenses, which is capable of continuous and highly efficient production of glass beads with excellent sphericity.

In order to achieve the above purpose, the glass beads producing method and apparatus of the present invention comprises the following steps and configurations.

The method for producing glass beads of the present invention comprises a step of dripping a liquid glass droplet into cooling solution by dripping molten glass from a nozzle, and a step of cooling wherein during a period when the liquid glass droplet is cooled down to a temperature lower than the glass transfer temperature in the cooling solution, the liquid glass droplet is covered with a bubble layer generated as the cooling solution is vaporized, and the liquid glass droplet in the cooling solution is slowly cooled and lowered in falling speed.

In such a manufacturing method, a bubble layer is formed over the entire periphery of the liquid glass droplet in the cooling solution, and the bubble layer is continuously formed until the temperature becomes lower than the glass transfer temperature. Accordingly, the glass droplet is slowly cooled, during which period the high-temperature liquid glass droplet is spherically formed due to the surface tension thereof, and thereby, a glass bead with excellent sphericity can be produced.

Also, the apparatus for producing glass beads of the present invention comprises a melting pot for heating and melting glass, a nozzle for dripping molten glass in the melting pot, which is disposed at the bottom of the melting pot, and a liquid glass droplet receiver filled with cooling solution for cooling the liquid glass droplet dripped from the nozzle, which is disposed under the nozzle, wherein the cooling solution is made from a material that forms a bubble layer around the liquid glass droplet as the cooling solution is vaporized due to the heat of the liquid glass droplet during a period when the liquid glass droplet is cooled down to a temperature lower than the glass transfer temperature in the cooling solution.

In such a manufacturing apparatus, a bubble layer is formed over the entire periphery of the liquid glass droplet in the cooling solution, and the bubble layer is continuously formed until the temperature becomes lower than the glass transfer temperature, and as a result, the liquid glass droplet is slowly cooled, during which time the high-temperature liquid glass droplet is spherically formed due to the surface tension thereof, and thereby, a glass beard with excellent sphericity can be produced.

Further, the apparatus comprises a dripping means for dripping molten glass wherein an air feeder is connected to the melting pot being sealed, and high-pressure gas under control is introduced from the air feeder into the melting pot, and a moving mechanism wherein the liquid glass droplet receiver can be two-dimensionally moved in the horizontal direction. Thus, the manufacturing apparatus moves the liquid glass droplet receiver in synchronism with the dripping means, and thereby, it is possible to produce a glass bead with excellent mass-productivity.

DETAILED DESCRIPTION OF PREFERRED EMBODIMENT

First Exemplary Embodiment

Figure 1:
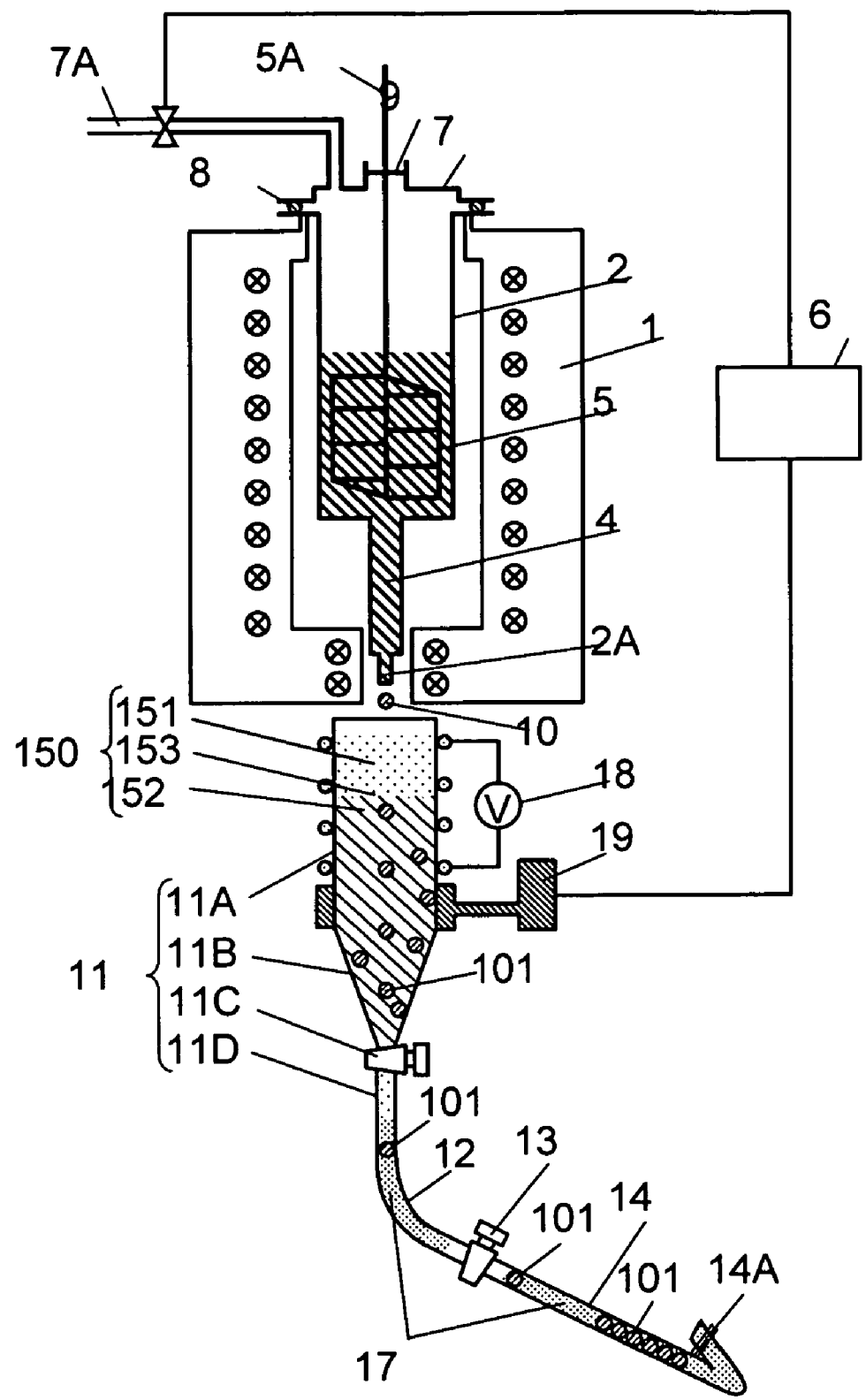
FIG. 1 is a schematic block diagram of a glass bead producing apparatus of the present invention.

FIG. 1 is a schematic block diagram of a glass beads producing apparatus of the present invention. This apparatus is nearly vertically arranged as a whole. That is, a platinum pot as melting pot 2 and electric furnace 1 arranged so as to surround the platinum pot 2 are arranged at the top of liquid glass droplet receiver 11. At the bottom of the platinum pot 2 is disposed dripping nozzle 2A extended from the platinum pot 2. The platinum pot 2 is filled with molten glass 4 in a state of being melted, and the molten glass 4 is stirred by stirring blade 5 made of platinum so that its whole uniformity is maintained for a long period of time. Further, at the top of the platinum pot 2 is securely disposed metal lid 7 which is fastened to the platinum pot 2 via O-ring seal 8. Also, the gap between the metal lid 7 and stirring blade rotating shaft 5A is sealed with well-known sealing member 9 made from resilient material such as rubber so that the stirring blade 5 can be freely rotated from outside.

Further, the metal lid 7 is integrally furnished with air feeder 7A. It is possible to introduce high-pressure air being controlled by control unit 6 into the space of the platinum pot 2 through the air feeder 7A. The air feeder 7A and the control unit 6 make up a dripping means. With the pressure of the high-pressure air introduced by the air feeder 7A into the platinum pot 2, molten glass 4 can be dripped at proper intervals by the amount determined by the nozzle diameter of the dripping nozzle 2A. When organic material is used as the O-ring seal 8 and the sealing member 9, it is desirable to cool the peripheries thereof. Also, it may be desireable to separately make the air feeder 7A and securely dispose it via a seal instead of using an integral configuration with the metal lid 7 as shown in FIG. 1. Further, melting pot 2 is described in this exemplary embodiment as a platinum pot, but it is noted that there is no particular restrictions on the material of the pot provided that the pot is made of a material that does not react with molten glass.

In an apparatus having such a configuration, when molten glass 4 is dripped from dripping nozzle 2A, the weight of liquid glass droplet 10 dripped from the tip of dripping nozzle 2A is determined by the outer diameter of dripping nozzle 2A and the surface tension of glass, and the relationship can be obtained by formula (1).

$$m \cdot g = \pi \cdot D \cdot \gamma \quad (1)$$

where m is weight of liquid glass droplet 10, g is gravitational acceleration, D is outer diameter of dripping nozzle 2A, and γ is surface tension of molten glass.

As is obvious from formula (1), liquid glass droplet 10 can be dripped by the weight determined by the outer diameter D of dripping nozzle 2A. However, if it is naturally dripped without applying pressures to the surface of molten glass 4, it will take much more time for dripping, and the productivity cannot be improved. In the case of the producing apparatus of this embodiment, high-pressure air is introduced from air feeder 7A into the space of platinum pot 2 in order to apply pressures to the surface of molten glass 4, thereby enabling the dripping at proper intervals, and it is possible to greatly improve the productivity for producing glass beads.

Under the dripping nozzle 2A is arranged liquid glass droplet receiver 11 spaced apart from the tip of the dripping nozzle 2A. The liquid glass droplet receiver 11 comprises large-diameter pipe 11A, tapered portion 11B formed at the lower part of the large-diameter pipe 11A, valve 11C connected to the lower part thereof, and small-diameter pipe 11D connected to the valve 11C. Further, hose 12 is connected to the small-diameter pipe 11D, and also, replaceable hose 14 is connected to the hose 12 via valve 13. The opening of dripping nozzle 2A is arranged in such manner that the liquid glass droplet 10 vertically drops to the surface of cooling solution 150.

The liquid glass droplet receiver 11 is filled with cooling solution 150, which includes at least two kinds of solutions that differ in viscosity. That is, first solution 151 of low viscosity is disposed at the upper part of liquid glass droplet receiver 11, and second solution 152 higher in viscosity than the first solution 151 is disposed thereunder. As for the boundary between the first solution 151 and the second solution 152, solutions are selected by which relatively clear interface 153 can be formed. Also, the hose from the valve 11C of liquid glass droplet receiver 11 to the replaceable hose 14 is desirably filled with water 17. And, removable clamp 14A is fitted to one end of the replaceable hose 14, which serves to prevent water leakage during the production of glass beads 101. When taking out glass beads 101 that have been produced, the clamp 14A can be removed to easily take out the glass beads 101.

Further, the liquid glass droplet receiver 11 is provided with liquid temperature control unit 18 for setting the cooling solution 150 to the predetermined temperature. The liquid temperature control unit 18 is not only able to control the entire cooling solution 150 to a uniform temperature, but also, for example, able to keep the first solution 151 and the second solution 152 at the predetermined temperatures respectively and to make the cooling solution 150 have a continuous temperature gradient.

Also, when dripping the molten glass 4 continuously into the cooling solution 150, it is desirable that the liquid glass droplets 10 do not come into contact with each other in the cooling solution 150 until they are hardened. Accordingly, moving mechanism 19 for changing the dripping position is disposed in that the liquid glass droplet receiver 11 is two-dimensionally moved in the horizontal direction relative to the dripping duct by controlling the moving mechanism 19 from the control unit 6 of the dripping means.

The liquid glass droplets 10 dripped from the dripping nozzle 2A are cooled in the cooling solution 150 made up of the first solution 151 and the second solution 152 and then turn into glass beads 101. The glass beads 101 go down to the replaceable hose 14, passing through the valve 11C being open, the hose 12, and the valve 13 being open, and are collected in the replaceable hose 14. In the apparatus of this exemplary embodiment, the replaceable hose 14 serves as a collecting portion. When a specific amount of glass beads 101 has been collected, the valve 13 is closed and the replaceable hose 14 is removed, and then the glass beads 101 are taken out of the replaceable hose 14. The length of the replaceable hose 14 can be determined according to the required amount of glass beads collected. The hose 12 and the replaceable hose 14 are filled with water 17 in order to improve the fluidity of the glass beads 101 in these hoses. After taking out the glass beads 101 collected, the replaceable hose 14 newly filled with water 17 is fitted to the valve 13, and thus, the glass beads 101 can be collected again by opening the valve 13.

Figure 2:
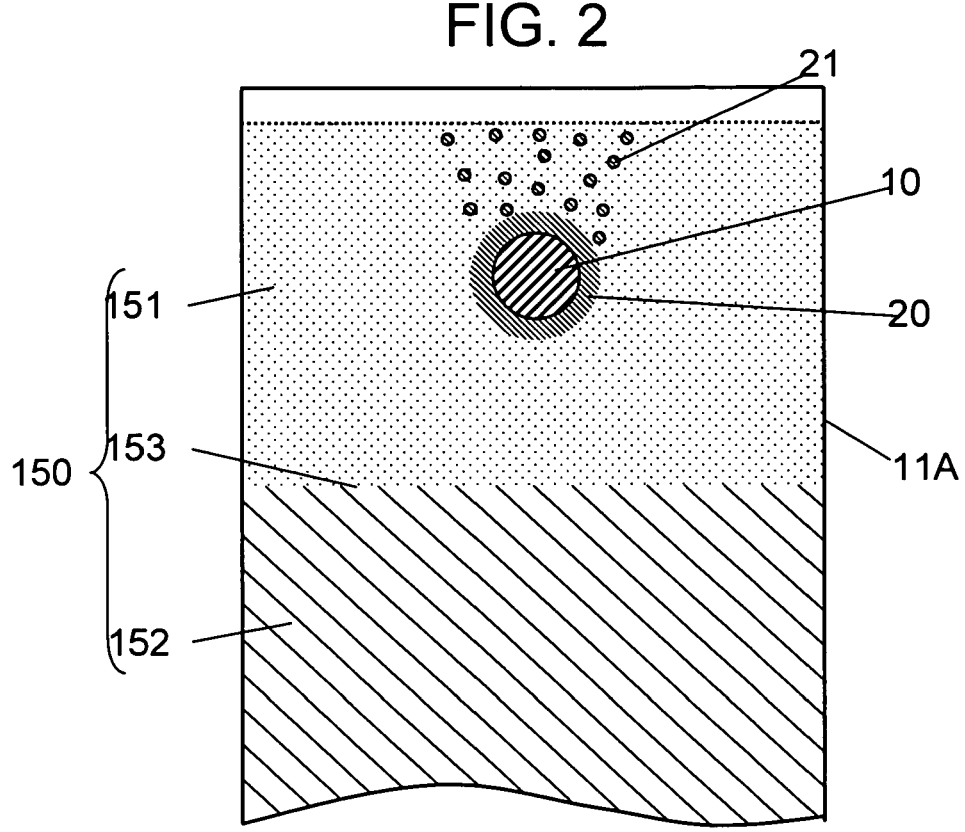
FIGS. 2, 3, and 4 are schematic views showing a glass bead forming process in the first exemplary embodiment of the present invention.
Figure 3:
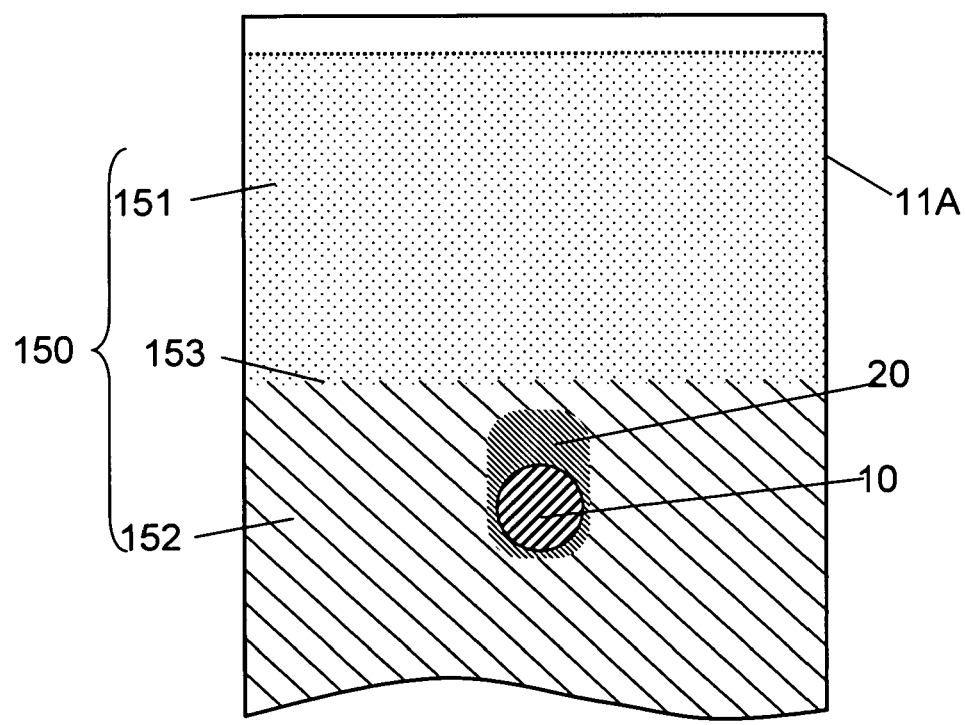
Figure 4:
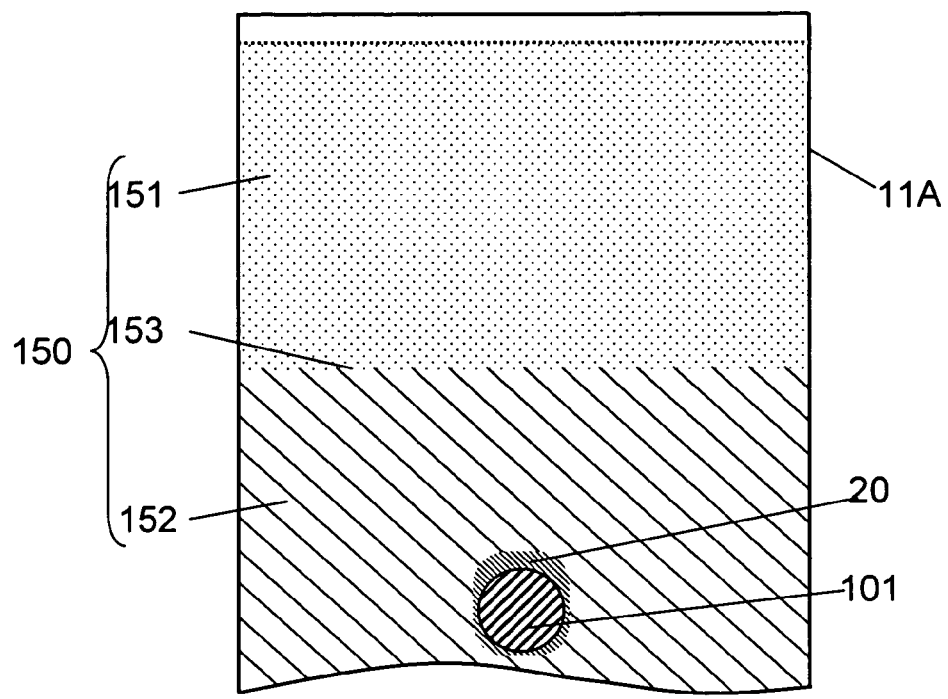

The actions of the cooling solution 150 when producing glass beads 101 by such apparatus will be described with reference to FIG. 2 to FIG. 4. FIG. 2 to FIG. 4 are schematic views showing the step of forming the glass beads 101 wherein liquid glass droplets 10 are dripped into the cooling solution 150 in the liquid glass droplet receiver 11. In the following description, the first solution is water as the cooling solution 150, and the second solution 152 is gelatinized starch solution (hereafter called the first gelatinized starch solution) prepared by heating and stirring 30 g of potato starch at 80° C. while dissolving it in 1000 cc of water, and the temperature of the cooling solution 150 made up of these solutions is controlled to 60° C. as an example. Also, borosilicate glass is used as the molten glass 4, which is heated up to 1150° C. and dripped in a molten status in the description.

The liquid glass droplet 10 dripped from the dripping nozzle 2A by the weight determined by the nozzle diameter first comes in contact with the first solution 151 that is water. At the time, since the liquid glass droplet 10 is very hot, the water or the first solution 151 around the liquid glass droplets 10 is vaporized, thereby forming bubble layer 20 around the liquid glass droplet 10 as shown in FIG. 2. Fine bubbles 21 are generated from the bubble layer 20, but the fine bubbles 21 go up to the surface of the first solution 151 and then disappear. In this condition, the liquid glass droplet 10 is still very hot, causing the first solution 151 to be vaporized and the fine bubbles 21 to be generated, and it goes downward in the first solution 151 with the bubble layer 20 still formed therearound.

When the liquid glass droplet 10 further goes downward and passes through the interface 153, the liquid glass droplet 10 with the bubble layer 20 formed therearound goes into the first gelatinized starch solution that is the second solution 152. Even in the second solution 152, the liquid glass droplet 10 is still very hot, and the second solution 152 is continuously vaporized, keeping the bubble layer 20 formed therearound. At the time, since the bubble layer 20 is surrounded by the second solution 152 of high viscosity, the fine bubbles 21 generated from the bubble layer 20 will take much time to go through the second solution 152 of high viscosity. Therefore, as shown in FIG. 3, the bubble layer 20 swells at the top thereof. Namely, the first gelatinized starch solution as the second solution 152 acts as a coat to enclose the entire periphery of the bubble layer 20, thereby preventing the bubble layer 20 from disappearing. Even in that condition, the liquid glass droplet 10 is still very hot, and vapor is continuously generated therearound, giving rise to the growth of the bubble layer 20. As a result, the liquid glass droplet 10 stops going downward due to buoyancy that acts upon the liquid glass droplet 10.

When the liquid glass droplet 10 is slowly cooled and becomes lower than the glass transfer temperature, the liquid glass droplet 10 hardens and turns into glass bead 101. When the glass bead 101 is at such a temperature, the bubble layer 20 therearound is gradually absorbed by the first gelatinized starch solution that is the second solution 152 therearound, and becomes smaller in size. Consequently, since the weight of glass bead 101 exceeds the buoyancy, the glass bead 101 slowly goes downward as shown in FIG. 4. Then, the temperature of the glass bead 101 is lower than the glass transfer temperature. Accordingly, even when the bubble layer 20 disappears from around the glass bead 101, and the glass bead 101 comes into direct contact with the first gelatinized starch solution, it will not cause burning of the starch components, organic matters such as amylose or amylopectin.

When the weight of liquid glass droplet 10 is about 60 mg, the time required for the liquid glass droplet 10 to be cooled in a state of floating while being surrounded by the bubble layer 20 is about 12 to 14 seconds. That is, despite that cooling solution 150 is used for the manufacture, the effect obtained is same as in a manufacturing method wherein it is naturally dropped and slowly cooled in air for 12 to 14 seconds. Consequently, it is possible to obtain glass beads 101 with excellent sphericity and less defects such as cracks and vacuum bubbles.

Also, as described above, in the manufacturing method of the present invention, the floating time of the liquid glass droplet 10 surrounded by bubble layer 20 ranges from 12 seconds to 14 seconds. Accordingly, when more than one liquid glass droplet 10 is dripped from the dripping nozzle 2A into approximately the same portion of the cooling solution 150 within a period of 12 seconds or less, the liquid glass droplets 10 come into contact with each other, sometimes causing them to be bonded to each other or cracked. These glass droplets may not be spherical, They may be in a state of being bonded to each other or cracked and cannot be used as preform material. In order to prevent such phenomenon and to shorten the dripping tact time between liquid glass droplet dripping, there is provided the moving mechanism 19 which moves the position of cooling solution 150 two-dimensionally in the horizontal direction between every dripping of liquid glass droplets 10. The moving mechanism 19 can be moved by the control unit 6 of the dripping means in accordance with the dripping tact time. It is desirable to freely select the way of moving, for example, linear movement over a distance, rotational movement over a distance or a combination of these every dripping, provided that the next liquid glass droplet 10 is not dripped into same portion before the previous liquid glass droplet 10 dripped into that portion is desirably solidified.

In the present exemplary embodiment, as for the behavior in the cooling solution 150 until the liquid glass droplet 10 turns into glass bead 101, the second solution 152 is a first gelatinized starch solution in the description. In this manufacturing apparatus, however, it is not limited to this material. As starch, it is also possible to use corn starch, sweet potato starch, or rice starch as well as potato starch that is the first gelatinized starch solution. In this case, it is desirable to use potato starch because the viscosity can be kept high even with same amount of starch in a state of being gelatinized.

Also, as the cooling solution, it is also possible to use a solution of which the surface portion firstly coming into contact with the liquid glass droplets is lower in viscosity than the region thereunder. Further, it is desirable to drip the liquid glass droplets in a direction vertical to the cooling solution. Due to such configuration, it is possible to prevent the liquid glass droplets for being deformed by shocks when dripped into the cooling solution and to obtain glass beads with higher sphericity. Moreover, by using an noncombustible solution for the surface portion of the cooling solution, firstly coming into contact with the liquid glass beads, it is possible to prevent the generation of a fire or the like even in case hot liquid glass droplets of about 1,000° C. are dripped into the cooling solution.

Also, synthetic paste can be used as the cooling solution, and same effects as in the case of gelatinized starch solution can be obtained. Further, similar effects can be obtained by using, as the cooling solution, a configuration comprising an oil whose surface portion firstly coming into contact with the liquid glass droplets is lower in viscosity and an oil disposed thereunder which is higher in viscosity than the surface portion.

It is also desirable to use a solution including surfactant as the cooling solution. In this case, as the cooling solution, it is preferable to employ a two-layer configuration in which surfactant-contained water is disposed as the surface portion firstly coming into contact with the liquid glass droplets, and gelatinized starch solution or synthetic paste solution is disposed thereunder. In this case, the coat of the gelatinized starch solution or synthetic paste solution formed around the bubble layer covering the liquid glass droplet due to the action of the surfactant is stabilized. Accordingly, the bubble layer covering the entire surface of the liquid glass droplet will be continuously maintained for a longer time. As a result, a larger bubble layer will be formed, causing the liquid glass droplet to be given greater buoyancy and its entire body to be floated along with a rotational force. In this way, the liquid glass droplet is gradually cooled, and due to the efficient actions of surface tension and centrifugal forces generated due to rotation, it is possible to more precisely prevent the generation of vacuum bubbles or cracks and at the same time to produce glass beads with excellent sphericity.

Also, as the shape of the liquid glass droplet receiver, the region where the liquid glass droplets turn into glass beads is larger in area, which is gradually reduced in area downwards. Accordingly, glass beads can be easily introduced into the collector portion. Also, since the collector portion is replaceable, it is possible to remove or attach only the replaceable hose, collector portion, while stopping the cooling solution, and in this way, the glass beads can be efficiently taken out.

Second Exemplary Embodiment

By using the manufacturing apparatus described above, specific description will be given in the following with respect to a method for producing glass beads by using various cooling solutions of the present invention. In the present preferred embodiment, cooling solution 150 filled into the large-diameter pipe 11A of liquid glass droplet receiver 11 is of two-layer configuration, and its composition is varied to produce glass beads. The liquid level of the second solution 152, lower part of the cooling solution 150, is 150 mm, and the first solution 151 in liquid level of 50 mm is disposed above the second solution 152. Further, the temperature of cooling solution 150 is controlled to 60° C. by liquid temperature control unit 18. Also, the distance from the dripping nozzle 2A to the surface of first solution 151 is 20 mm, and liquid glass droplet 10 made of borosilicate glass melted at 1150° C. is dripped by weight of 60 mg to produce a glass bead.

The cooling solution 150 for the first experiment was prepared as described in the following. As the second solution 152, gelatinized potato starch solution was employed. After dissolving 30 g of potato starch in water to make it 1,000 cc as a whole, the solution was heated up to 80° C. An gelatinized with stirring. Namely, it is the same as the first gelatinized starch solution in the first exemplary embodiment. Also, the first solution 151 used is lower in viscosity than the first gelatinized starch solution being the second solution 152. It may be desirable to use water as first solution 151, which has the added advantage of being noncombustible. As to the cooling solution 150 prepared in this way, the upper part, first solution 151, is water, and the lower part, second solution 152, is the first gelatinized starch solution. Therefore, both solutions do not become mixed with each other for about a few hours to scores of hours, making it possible to maintain the stable status of the two layers. That is, the cooling solution 150 is desirably the same in composition and conditions as the example in the first exemplary embodiment, above. Accordingly, when the liquid glass droplet 10 is dripped into the cooling solution 150, the behavior of the liquid glass droplet 10 until turning into glass bead 101 in the cooling solution 150 is same as the behavior described in the first exemplary embodiment, and therefore, the description is omitted.

The cooling solution 150 for the second experiment was prepared as described in the following. As the second solution 152, 20 g of potato starch was put into water to make it 1,000 cc, and the solution was heated up to 80° C. and gelatinized with stirring (hereafter it is called the second gelatinized starch solution). Also, the first solution 150 used is water the same as in the first experiment. As to the cooling solution 151 prepared in this way, both solutions do not become mixed with each other for a few hours to scores of hours the same as in the first experiment, making it possible to maintain the stable status of the two layers.

Figure 5:
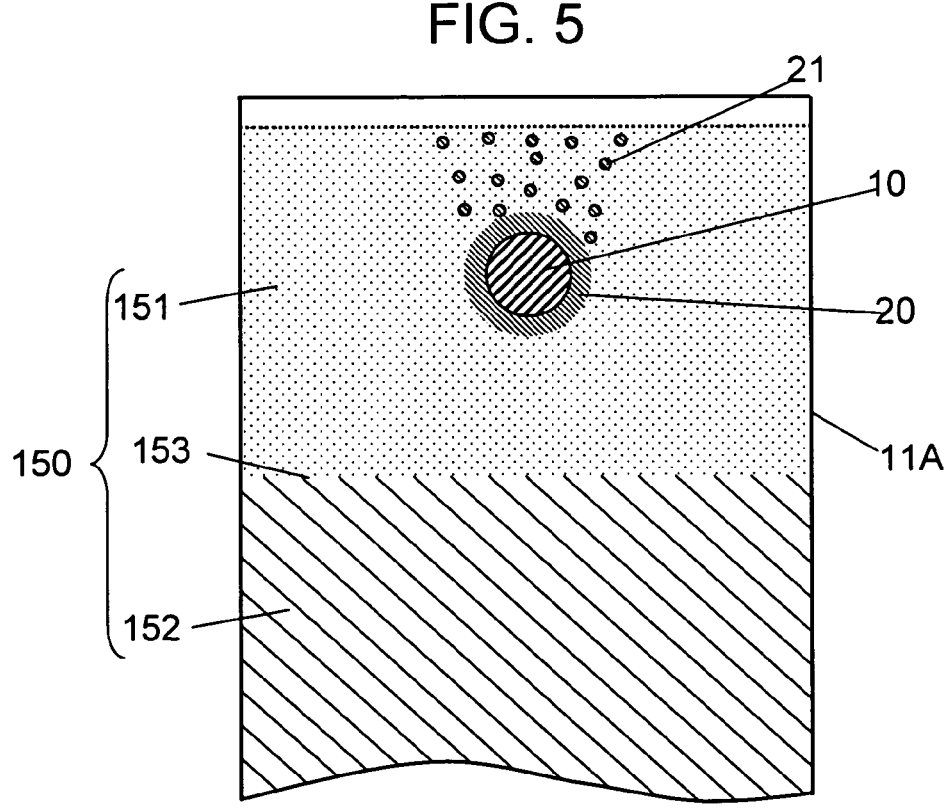
FIGS. 5, 6, 7, 8, 9, and 10 are schematic views showing a glass bead forming process in the case of using the cooling solution of the second experiment in the second exemplary embodiment of the present invention.
Figure 6:
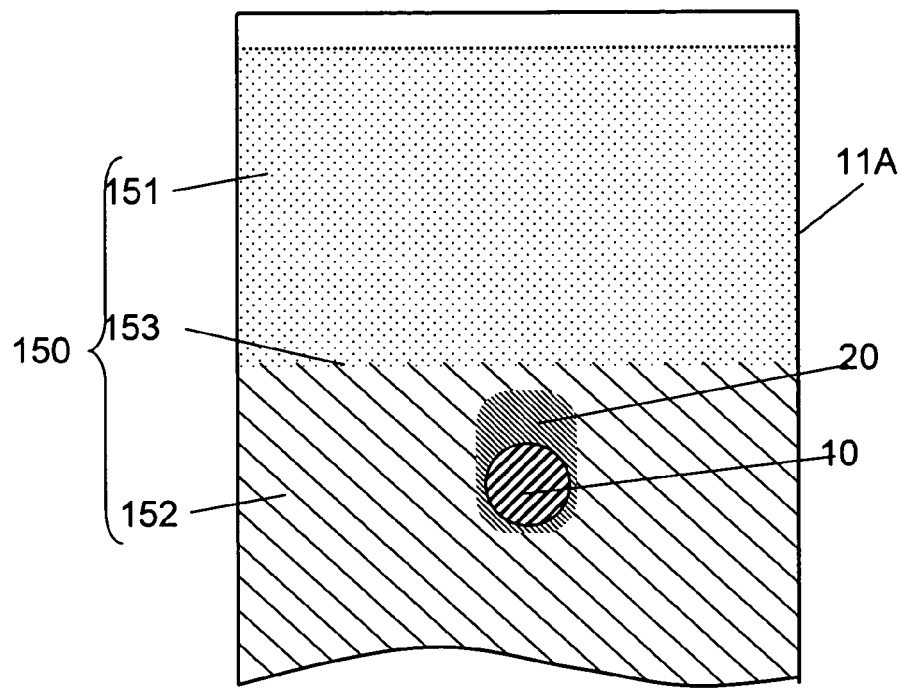

In the case of the second experiment, the behavior of the liquid glass droplet 10 after dripping until turning into glass bead 101 will be described with reference to FIG. 5 to FIG. 10. When the liquid glass droplet 10 is dripped into the water, first solution 151, then bubble layer 20 is formed around the liquid glass droplet 10 as shown in FIG. 5. Fine bubbles 21 are generated from the bubble layer 20 and move upward in the water, first solution 151, and disappear reaching the surface thereof. This is completely same as in the case of the first experiment. While indicating such a phenomenon, the liquid glass droplet 10 moves downward in the second gelatinized starch solution that is the second solution 152. When it goes into the second gelatinized starch solution, since the second gelatinized starch solution is higher in viscosity than the water of the first solution 151, the fine bubbles 21 generated from the bubble layer 20 are enclosed therein, causing the bubble layer 20 to be greatly swelled as shown in FIG. 6. As a result, the liquid glass droplet 10 stops moving downward.

Figure 7:
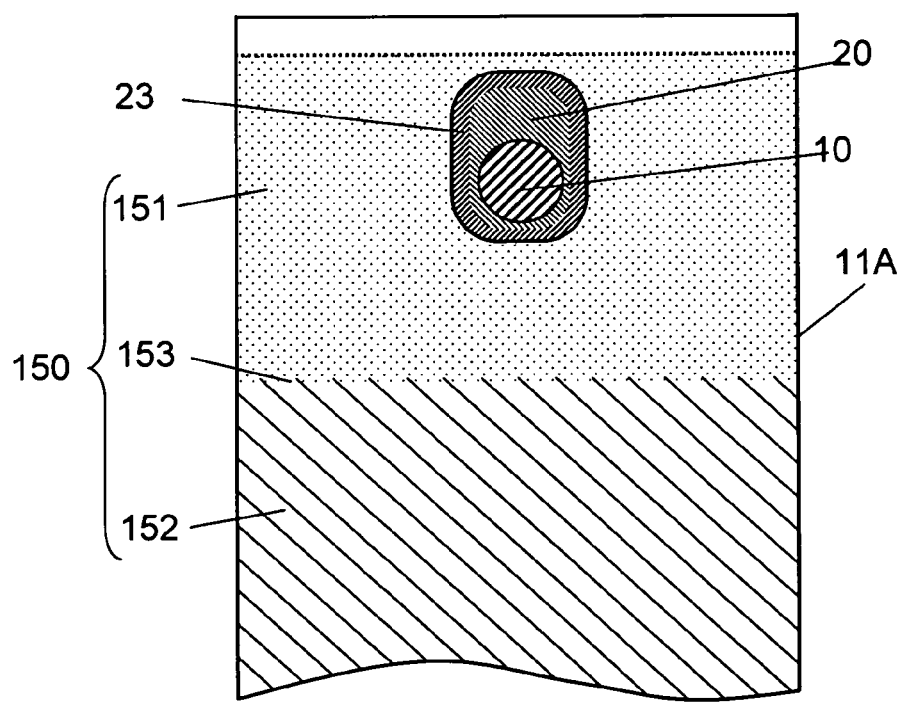
Figure 8:
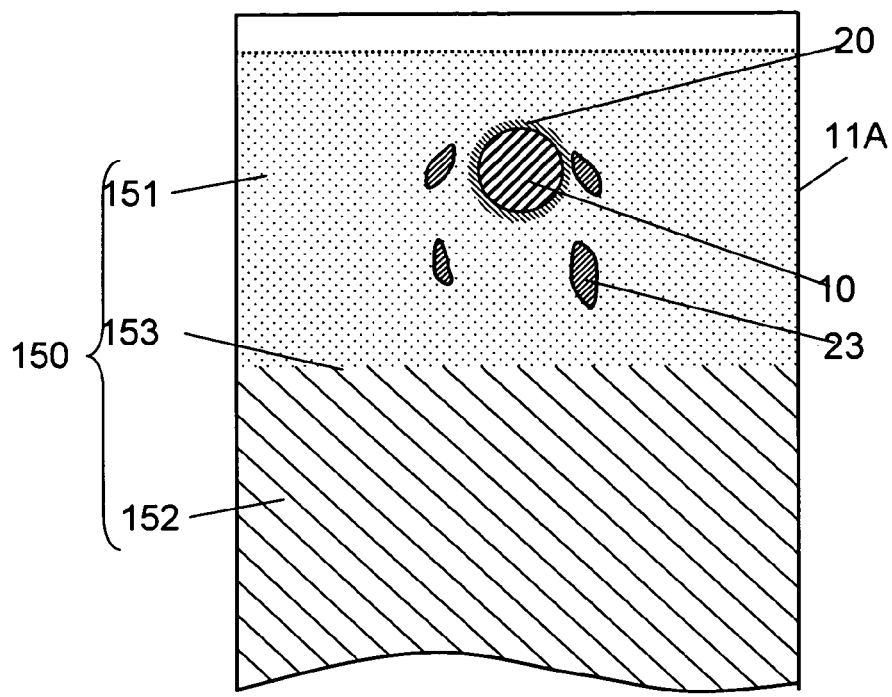

The second gelatinized starch solution in the second experiment is lower in concentration and in viscosity than the first gelatinized starch solution in the first experiment. Therefore, the liquid glass droplet 10 is floated due to buoyancy up into the water, first solution 151, together with the bubble layer 20 and coat 23 composed of the components of the second gelatinized starch solution formed in the peripheral region of the bubble layer. The status is shown in FIG. 7. A few seconds after such floating, the coat 23 is collapsed as shown in FIG. 8, and simultaneously, the bubble layer 20 is reduced in thickness. As a result, the buoyancy is decreased, causing the droplet to move downward toward the second gelatinized starch solution again.

Figure 9:
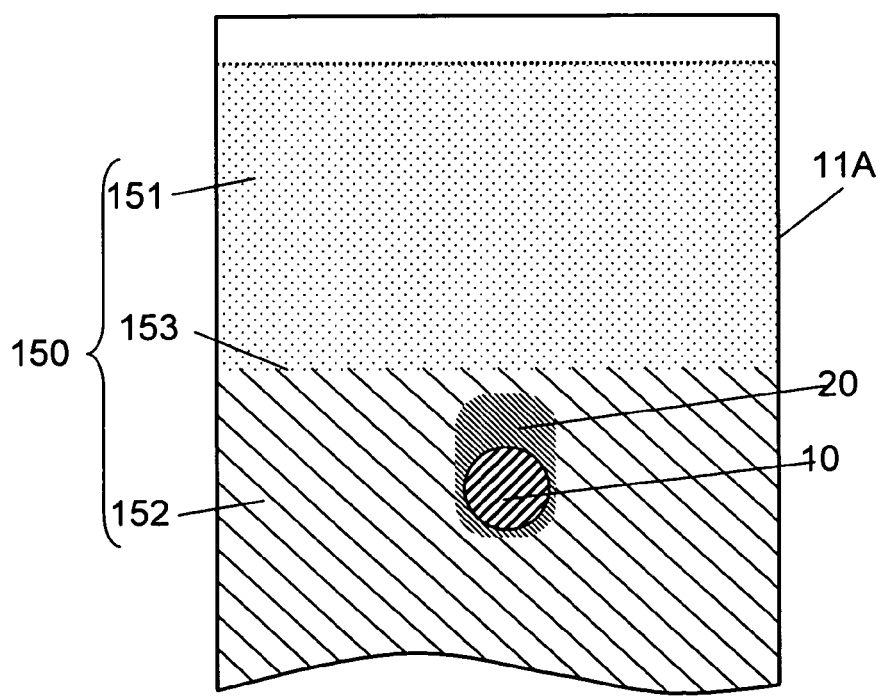
Figure 10:
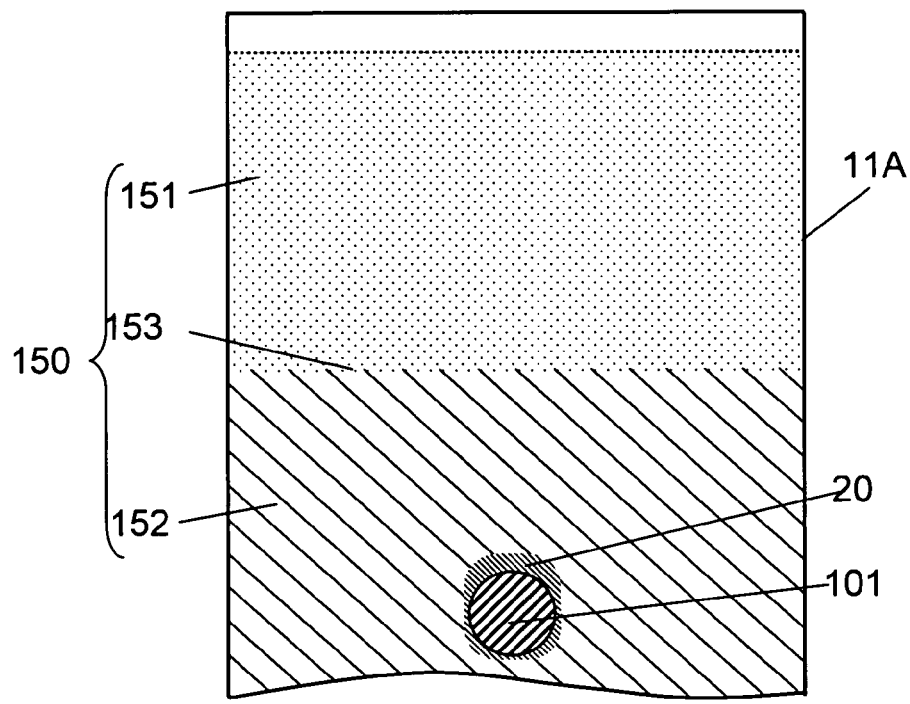

As shown in FIG. 9, around the liquid glass droplet 10 which has again moved down into the second gelatinized starch solution that is the second solution 152, the bubble layer 20 which has greatly swelled upward is again formed, causing the liquid glass droplet 10 to stop moving downward. After that, when the liquid glass droplet 10 is cooled down to a temperature below the glass transfer temperature, the bubble layer 20 around the liquid glass droplet 10 is reduced. As the bubble layer 20 is reduced, the liquid glass droplet turns into glass bead 101 and begins to move downward as shown in FIG. 10. As described above, in the second experiment, the liquid glass droplet 10 moves down into the second solution 152 and again moves up into the first solution 151, and this is the point of big difference from the first experiment.

The cooling solution 150 for the third experiment was prepared as described in the following. As the second solution 152, 30 g of potato starch was put into water to make it 1,000 cc as a whole, and then the solution was heated up to 80° C. An gelatinized with stirring. Namely, the first gelatinized starch solution in the first experiment was employed. Also, as the first solution 151, 10 g of potato starch was put into water to make it 1,000 cc as s whole, and then the solution was heated up to 80° C. An gelatinized (hereafter it is called the third gelatinized starch solution). The third gelatinized starch solution is lower in viscosity than the first gelatinized starch solution, second solution 152, but higher than water. As to the cooling solution 150 prepared in this way, since each solution is gelatinized, the solutions do not become mixed with each other for a few hours to scores of hours almost same as in the above experiments, making it possible to maintain the stable status of the two layers.

Figure 11:
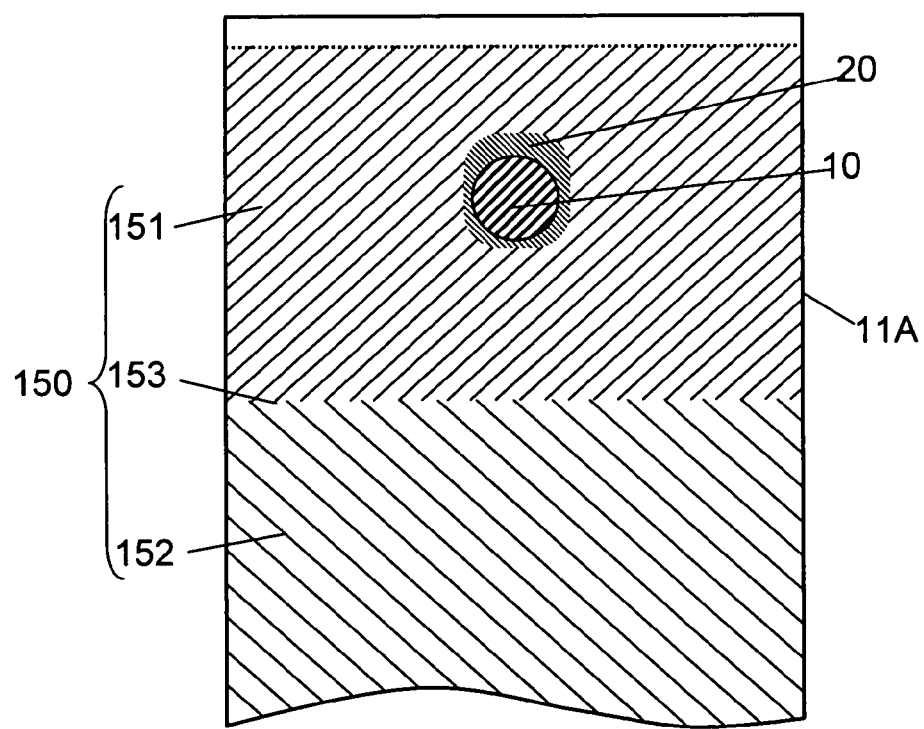
FIGS. 11, 12, and FIG. 13 are schematic views showing a glass bead forming process inthe case of using the cooling solution of the third experiment in the second exemplary embodiment of the present invention.
Figure 12:
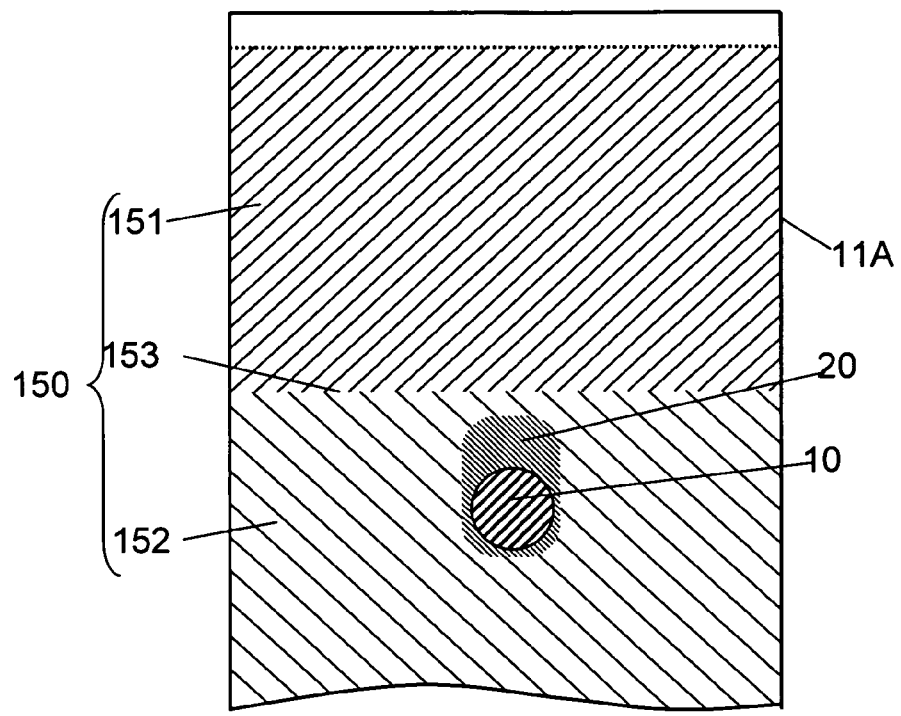
Figure 13:
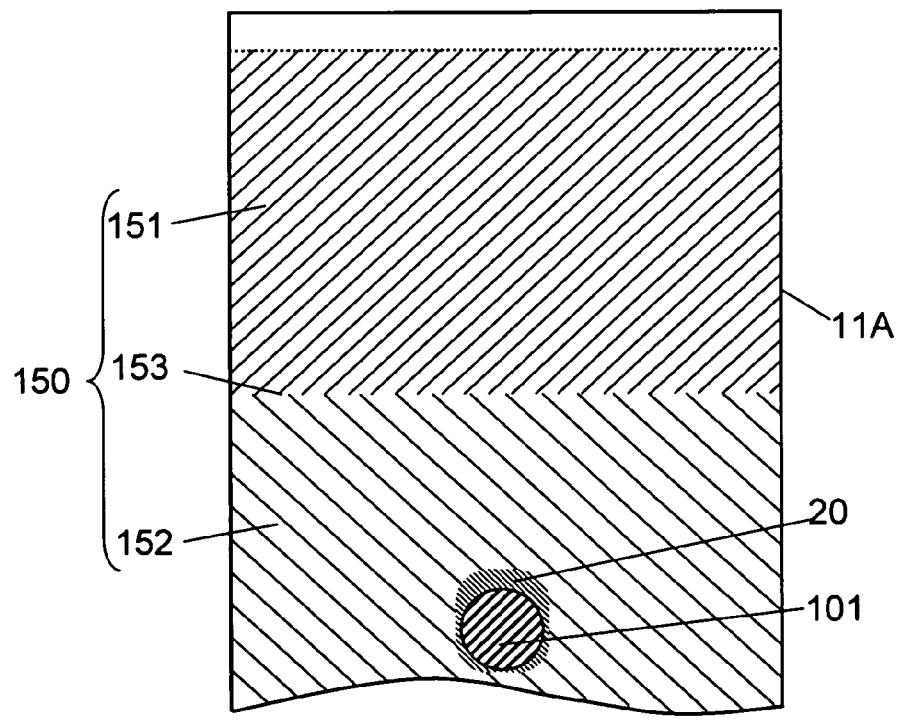

The behavior of the liquid glass droplet 10 after dripping until turning into a glass bead in this third experiment is described with reference to FIG. 11 to FIG. 13. When the liquid glass droplet 10 is dripped into the third gelatinized starch solution that is the first solution 151, the bubble layer 20 a little swelling upward is formed around the liquid glass droplet 10 as shown in FIG. 11. However, unlike in the first experiment and the second experiment, fine bubbles are not generated from the bubble layer 20. When the droplet slowly moves downward with the bubble layer 20 formed therearound, it passes through the interface 153 and goes into the first gelatinized starch solution that is the second solution 152. In the first gelatinized starch solution, the bubble layer 20 greatly swells upward as shown in FIG. 12, and the liquid glass droplet 10 stops moving down due to the action of the resultant buoyancy. After that, the liquid glass droplet 10 is cooled down to a temperature below the glass transfer temperature and turns into glass bead 101 as shown in FIG. 13, and simultaneously, the bubble layer 20 is reduced. As a result, the glass bead 101 begins to move downward slowly. The behavior after FIG. 12 is same as in the first experiment.

The cooling solution 150 for the fourth experiment was prepared as described in the following. As the second solution 152, synthetic paste made from commercially available polyvinyl alcohol was employed. Also, as the first solution 151, water that is noncombustible liquid lower in viscosity than the synthetic paste was used. Also in this case, the solutions do not become mixed with each other for a few hours to scores of hours, making it possible to maintain the stable status of the two layers. In the case of this experiment, the behavior of liquid glass droplet 10 after dripping into the cooling solution 150 until turning into glass bead 101 is nearly the same as in the first experiment, and the description is omitted.

Next, the cooling solution 150 for the first comparative experiment was prepared. As the second solution 152, 10 g of potato starch was put into water to make it 1,000 cc as a whole, and the solution was heated up to 80° C. An gelatinized with stirring. Namely, the third gelatinized starch solution used as the first solution 151 in the third experiment was employed. Also, water was used as the first solution 151. Also in this configuration, the solutions do not become mixed with each other for a few hours to scores of hours, making it possible to maintain the stable status of the two layers.

Figure 14:
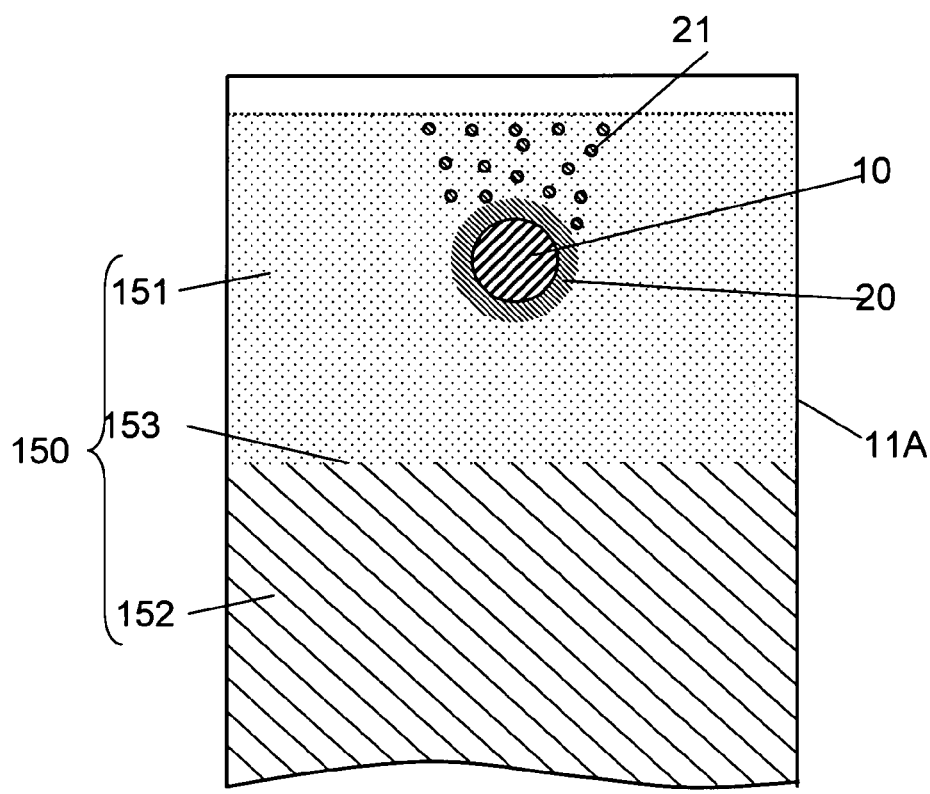
FIG. 14 to FIG. 16 are schematic views showing a glass bead forming process in the case of using the cooling solution of the first comparative experiment in the second exemplary embodiment of the present invention.
Figure 15:
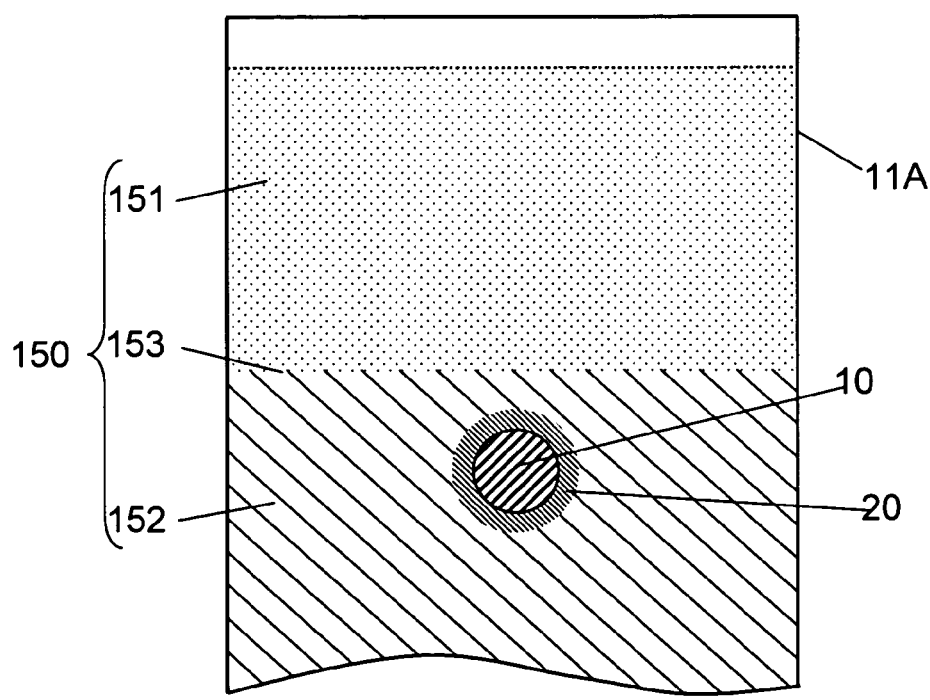
Figure 16:
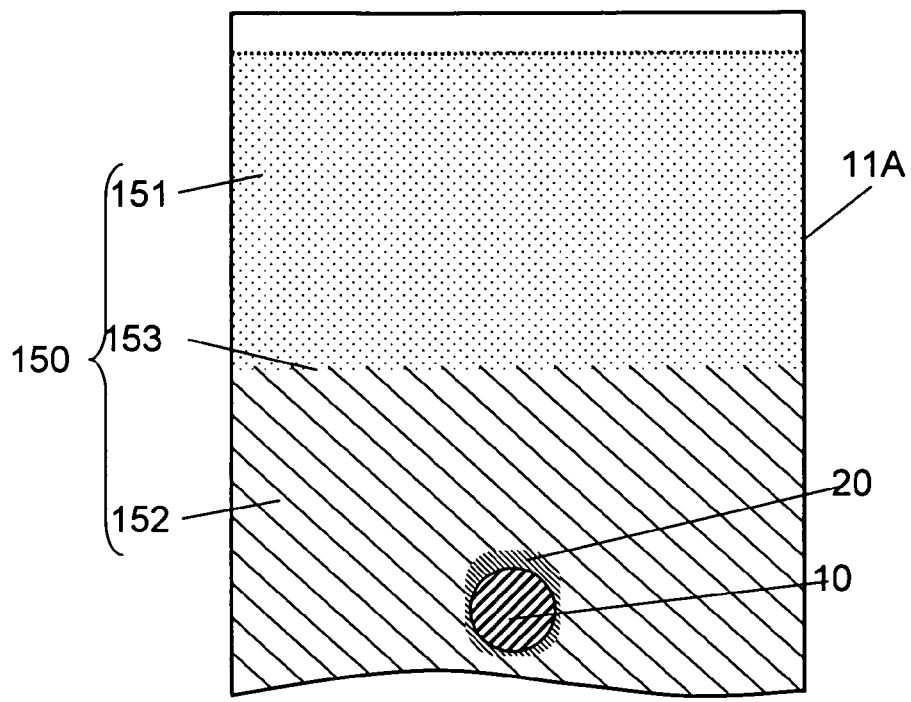

In the case of this first comparative experiment, the behavior of liquid glass droplet 10 after dripping until turning into glass bead 101 is described with reference to FIG. 14 to FIG. 16. When the liquid glass droplet 10 is dripped into the water that is the first solution 151, the bubble layer 20 is formed around the liquid glass droplet 10 as shown in FIG. 14. Simultaneously, fine bubbles 21 are generated from the bubble layer 20 and go up to the surface of the first solution 151 and then disappear. The liquid glass droplet 10 with the bubble layer 20 formed therearound passes through the interface 153 and goes down into the third gelatinized starch solution that is the second solution 152. The behavior so far is the same as in the first experiment and the second experiment. In the third gelatinized starch solution, the bubble layer 20 around the liquid glass droplet 10 swells slightly upward but not so greatly as in the first experiment and the second experiment. This is because the gelatinized starch is low in concentration. Accordingly, the buoyancy then obtained is not enough to stop the liquid glass droplet 10 but it only causes the liquid glass droplet 10 to lower its falling speed, and the liquid glass droplet 10 still continues going downward. The liquid glass droplet 10 is cooled while going downward, and when the temperature becomes less than the glass transfer temperature, it turns into glass bead 101, and then, the bubble layer 20 is hardly generated. It is shown in FIG. 16.

As to the first experiment through the fourth experiment, and the first comparative experiment, 280 pieces of glass beads 101 were produced under same conditions, and the sphericity and the surface status were observed. The sphericity was observed by measuring the shortest and longest diameters of glass bead 101 to obtain the percentage of the shortest and longest diameters. Namely, when it is closer to 100%, the sphericity is better. Also, as to the surface status, crack in glass bead 101, surface crack, and internally formed vacuum bubbles were observed visually and by microscopically. Incidentally, it has been confirmed in the past experiments that vacuum bubbles are often generated when glass bead 101 is rapidly cooled, and the generation of such defect makes it difficult to manufacture highly accurate lenses.

The results of evaluation are shown in Table 1.

TABLE 1

|  | First solution | Second solution | Sphericity (%) | Results of surface observation |
|---|---|---|---|---|
| First experiment | Water | First gelatinized starch solution | 98–99.5 | Fissure, crack, vacuum bubble rate: <5% |
| Second experiment | Water | Second gelatinized starch solution | 97–99 | Fissure, crack, vacuum bubble rate: <5% |
| Third experiment | Third gelatinized starch solution | First gelatinized starch solution | 95–97 | Fissure, crack, vacuum bubble rate: <5% |
| Fourth experiment | Water | Synthetic paste | 98–99.5 | Fissure, crack, vaccum bubble rate: <5% |
| First comparative experiment | Water | Third gelatinized starch solution | 96–98 | Fissure, crack, vacuum bubble: 100% |

As is obvious from Table 1, in the first comparative experiment, the sphericity is 96 to 98%, and the generation rate of fissure, crack and vacuum bubble (hereafter these are called defects) is 100%. As a result, in its comparison with the first experiment, the second experiment, and the fourth experiment, it has been found that the sphericity is worse and the generation rate of defects is very high. Accordingly, in the first comparative experiment, it has confirmed that the yield of glass bead 101 is greatly lowered resulting in poor productivity. On the other hand, in the first experiment through the fourth experiment, it has been observed that the sphericity slightly worsens as the potato starch, the second solution 152, is reduced in concentration. However, the results obtained are excellent because the generation rates of defects are all less than 5% that is the allowable limit value. In the case of glass bead 101 as preform material for the manufacture of lenses, the sphericity required is 95% or over, and therefore, all the values are acceptable with respect to sphericity including those obtained in the first comparative experiment.

When the results of the first experiment, the second experiment, the third experiment, and the first comparative experiment are compared, it has been confirmed that the defect generation of glass bead 101 is related with the concentration of gelatinized starch. That is, as is seen in the first experiment, the second experiment, and the third experiment, when the potato starch contained in the gelatinized starch solution being the second solution 152 is 20 g or over as against 1,000 cc of water, the value obtained with respect to the defect generation rate is smaller than 5% that is the allowable limit value. However, as is apparent in the first comparative experiment, when potato starch is 10 g as against 1000 cc of water, that is, 10 g/1000 cc, the defect generation rate is 100%. This is because the gelatinized starch as the second solution 152 is lower in concentration, and even when the liquid glass droplet 10 goes into the second solution 152, causing the bubble 20 to be generated therearound, a coat is not formed enough to enclose the fine bubbles 21 generated from the bubble layer 20. The fine bubbles 21 generated from the bubble layer 20 around the liquid glass droplet 10 are liable to pass through the thin coat, and the liquid glass droplet 10 will not be sufficiently covered with the bubble layer 20. As a result, only the surface of liquid glass droplet 10 is rapidly cooled, probably giving rise to the generation of defects. Accordingly, when water is used as the first solution, it is desirable to configure in that the liquid glass droplet 10 is retained in the water for as short time as possible before going into the second solution 152 and that a coat is sufficiently formed around the bubble layer 20 in the second solution.

On the other hand, when the potato starch exceeds 40 g, the concentration of gelatinized starch solution as the second solution 152 increases, and the falling speed of glass bead 101 becomes very slow. Consequently, the productivity is greatly lowered. Accordingly, in order to assure excellent sphericity without worsening the productivity, it is desirable to set the concentration in a range from 20 g to 40 g.

Also, sphericity is influenced by the impact generated when liquid glass droplet 10 thrusts into the cooling solution 150. The fact has been found through experiments executed by changing the viscosity of the first solution 151. This is because the thrust impact is greater when the viscosity is higher, causing the liquid glass droplet 10 to be deformed. The sphericity is lower in the third experiment than in the first experiment and the second experiment because the third gelatinized starch solution used as the first solution 151 in the third experiment is higher in viscosity as compared with the others. Accordingly, the first solution 151 is desirable to be as low in viscosity as possible. Also, when a liquid glass droplet is dripped, the dripping direction is desirable to be vertical to the cooling solution in order to decrease the impact. However, in the case of making oval glass bead 101, setting the viscosity of the first solution 151 in accordance with the weight of liquid glass droplet 10 and the distance to the surface of the cooling solution, it is also possible to obtain the glass bead 101 with intended flatness as the deforming action in thrusting into the first solution 151 is utilized.

Further, in the fourth experiment, synthetic paste made from polyvinyl alcohol is used as the second solution 152, and the sphericity obtained is equivalent to that obtained in the first experiment, and the defect generation rate is less than 5% that is the allowable limit value. Accordingly, as the cooling solution 150, it is desirable to use water as the first solution 151 and synthetic paste as the second solution 152. Also, when a synthetic paste lower in viscosity that the synthetic paste as the second solution 152 is used as the first solution 151, the results obtained are nearly same as in the third experiment.

In the present exemplary embodiment, potato starch is used, but corn starch, sweet potato starch, rice starch, and like starch are also available, which can be similarly used in the form of gelatin by mixing them with water in appropriate ratios. However, it is most preferable to use potato starch which can be increased in viscosity with less quantity when gelatinized.

Third Exemplary Embodiment

In this exemplary embodiment, the influences caused by the temperatures of cooling solution 150 are examined. The manufacturing conditions are the same as in the first experiment described in the second exemplary embodiment, above, using the same cooling solution 150. However, the temperature of the cooling solution 150 was varied to 55° C., 60° C., and 70° C. Under each temperature condition, 280 pieces of glass beads were prepared as the samples in order to observe the sphericity and surfaces. The methods of sphericity and surface observation are same as described in the second exemplary embodiment.

When the temperature of the cooling solution 150 is 55° C., liquid glass droplet 10, upon thrusting into water, the first solution 151, simultaneously makes a bumping noise, and drops into the first gelatinized starch solution that is the second solution 152. However, after thrusting into the first gelatinized starch solution, its behavior was similar to that in the first experiment of the second exemplary embodiment. On the other hand, when the temperature of the cooling solution 150 is 70° C., the behavior of the liquid glass droplet 10 in the cooling solution was completely same as in the first experiment of the second exemplary embodiment. In the case of setting the temperature of the cooling solution 150 to 60° C., the results are same as in the first experiment of the second exemplary embodiment. The evaluation results of glass beads produced under these conditions are shown in Table 2.

TABLE 2

| Cooling solution temp. | Sphericity (%) | Results of surface observation |
|---|---|---|
| 55° C. | 97–99 | Fissure, crack, vacuum bubble rate: 100% |
| 60° C. | 98–99.5 | Fissure, crack, vacuum bubble rate: <5% |
| 70° C. | 98.5–99.5 | Fissure, crack, vacuum bubble rate: <5% |

As is obvious from Table 2, when the temperature of the cooling solution 150 is 55° C., the sphericity ranges from 97% to 99%, but the defect generation rate is 100%. On the other hand, when the solution temperature is 60° C., the sphericity ranges from 98% to 99.5%, and at 70° C., it ranges from 98.5% to 99.5%, showing a tendency that the higher the solution temperature, better is the sphericity. Also, the defect generation rate of glass bead 101 is as good as less than 5%, the allowable limit value.

When the solution temperature is 55° C., only the surface of liquid glass droplet 10 is rapidly cooled and vacuum bubbling is liable to take place, and it has been found that the defect generation rate is greatly increased as a result. Judging from the result, in order to produce glass bead 101 with excellent sphericity and less rate of defect generation, it is desirable to set the temperature of the cooling solution 150 to 60° C. or over. As to the upper limit of the temperature, the only requirement is to maintain the stable state of the cooling solution 150, and for example, when water is used as the first solution, it is desirable to set the temperature to 100° C., i.e. the boiling point of water, or lower. Also, when oil or starch solution is used as the cooling solution, including the surface portion with which the liquid glass droplet first comes into contact, it is desirable to set the temperature to the boiling point or lower of the solution used.

Fourth Exemplary Embodiment

In this exemplary embodiment, a configuration is described in which surfactant is added into the first solution of the cooling solution formed of two layers. In the present embodiment, the influences of the surfactant added into the first solution were examined. Therefore, the following materials and conditions are same as described above. That is, as the second solution 152, the first gelatinized starch solution same as in the first experiment of the second exemplary embodiment was used. Also, the first gelatinized starch solution as the second solution 152 was filled into large-diameter pipe 11A of liquid glass droplet receiver 11 so as to make the solution level 150 mm, on which the first solution 151 was poured to make the solution level 50 mm. The temperature of the cooling solution 150 formed of these solutions was set to 50° C., and the distance from dripping nozzle 2A to the first solution 151 was set to 20 mm. Also, molten glass 4 used is borosilicate glass melted by heating at 1,150° C., which was dripped by 60 mg.

Figure 17:
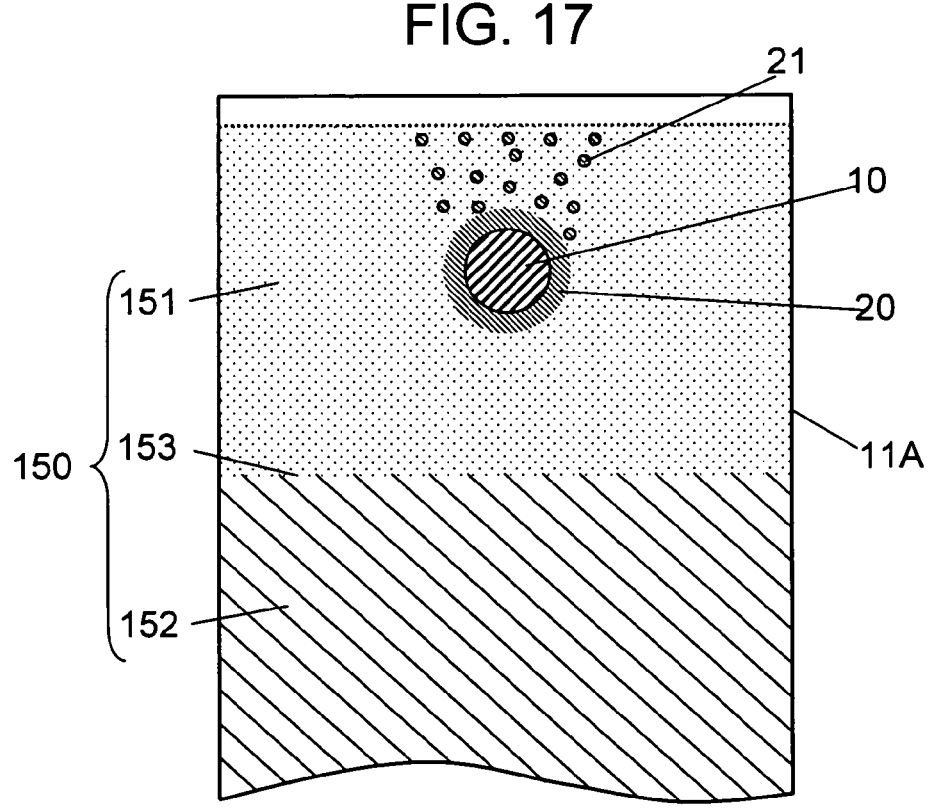
FIG. 17 to FIG. 21 are schematic views showing a glass bead forming process in the case of using the cooling solution of the fifth experiment in the fourth exemplary embodiment of the present invention.
Figure 18:
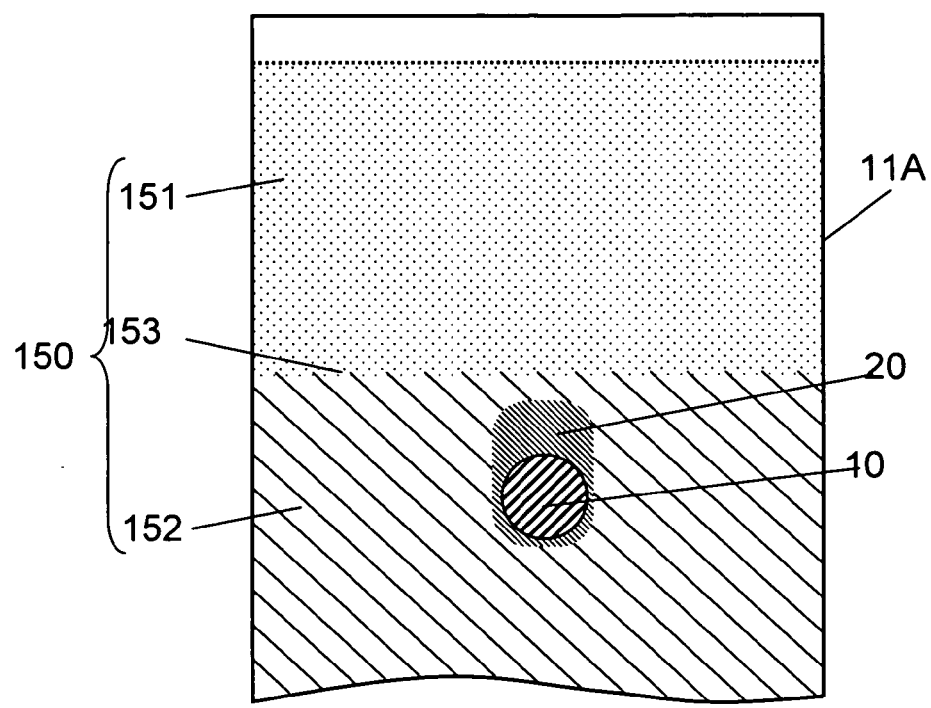

As the first solution 151 of the cooling solution 150 for the fifth experiment, water with nonionic surfactant added by 0.01 wt % (hereafter called the first addition water) was used. In the case of using the cooling solution 150 thus configured, the behavior of liquid glass droplet 10 after dripping into the cooling solution 150 until turning into glass droplet 101 will be described with reference to FIG. 17 to FIG. 21. When the liquid glass droplet 10 thrusts into the first addition water that is the first solution 151, bubble layer 20 is formed around the liquid glass droplet 10 as shown in FIG. 17. Further, fine bubbles 21 are generated from the bubble layer 20 and reach the surface of the first addition water and then disappear. The liquid glass droplet 10 with the bubble layer 20 formed therearound passes through interface 153 and goes down into the first gelatinized starch solution that is the second solution 152. In the first gelatinized starch solution, the bubble layer 20 largely swells upward as shown in FIG. 18, causing buoyancy to be generated, and then the liquid glass droplet 10 stops going downward.

Figure 19:
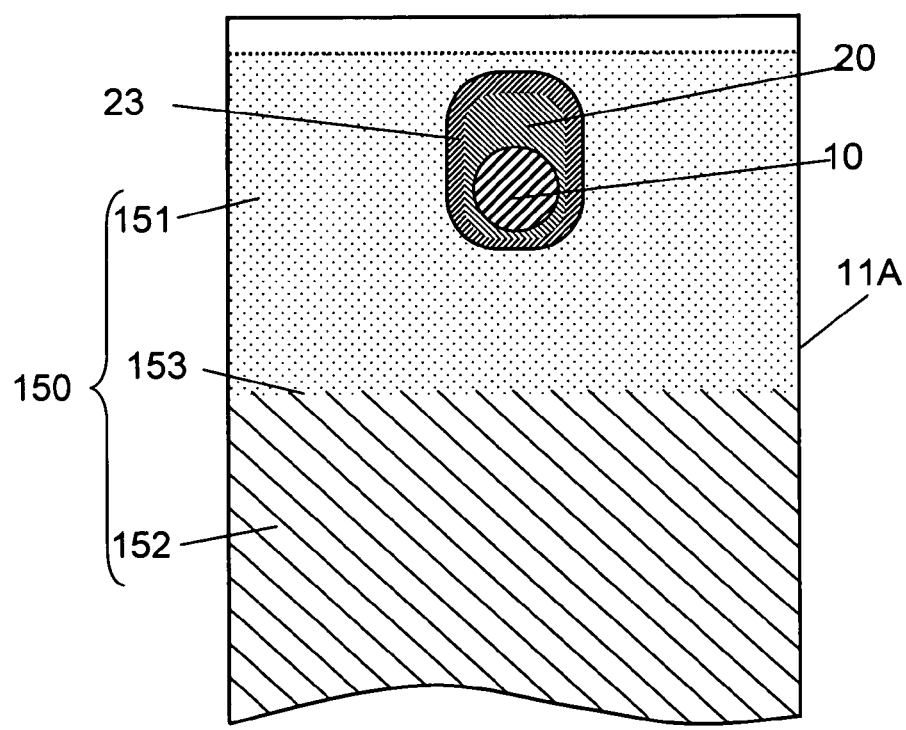
Figure 20:
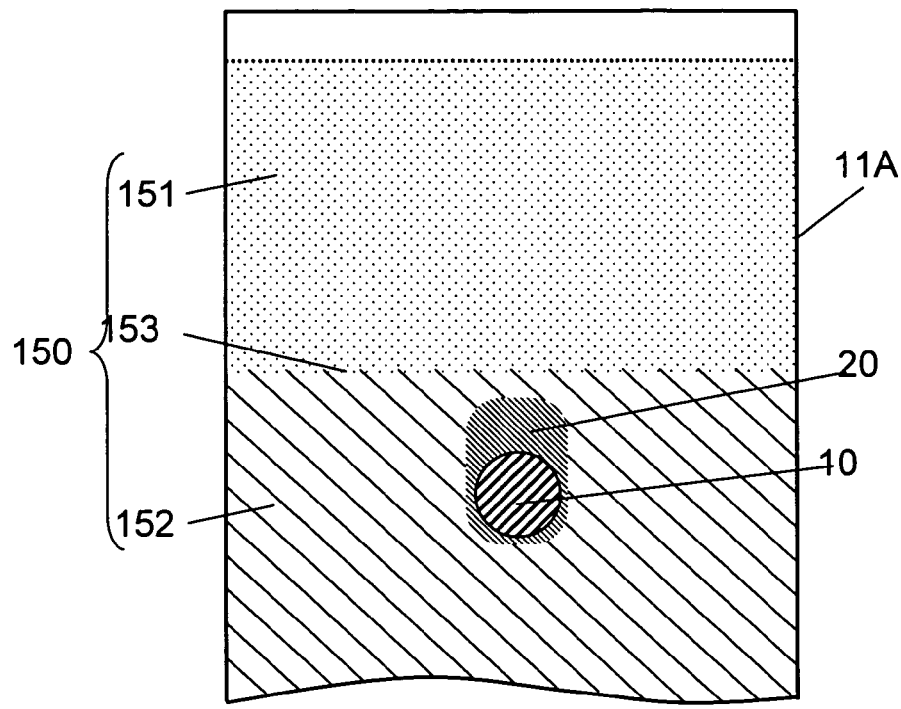
Figure 21:
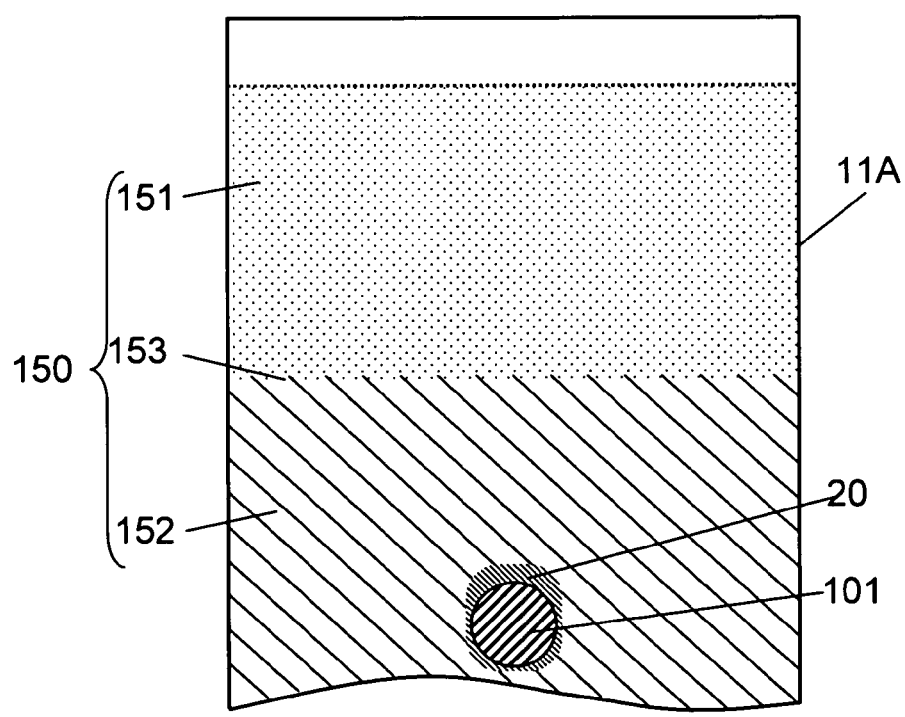

After that, as shown in FIG. 19, the liquid glass droplet 10 moves up into the first addition water along with the bubble layer 20 formed therearound and also with coat 23 composed of the first gelatinized starch solution formed around the periphery thereof. The behavior so far is nearly same as in the second experiment of the second exemplary embodiment. The first addition water contains nonionic surfactant, and the surfactant acts to prevent the coat 23 from collapsing, and then the liquid glass droplet 10 floats in the first addition water while repeating slight up-and-down motions for a little more than 10 seconds. As the temperature of the liquid glass droplet 10 is lowered, the bubble layer 20 is reduced in thickness and in buoyancy, then the liquid glass droplet again goes down into the first gelatinized starch solution as shown in FIG. 20. After that, it hardens and turns into glass bead 101 when the temperature becomes lower than the glass transfer temperature, and at the same time, begins to go downward as the bubble layer 20 is further reduced in thickness. It is shown in FIG. 21. The behavior from FIG. 20 to FIG. 21 is nearly same as in the second experiment.

As the first solution 151 of the cooling solution 150 for the sixth experiment, water with nonionic surfactant added by 0.001 wt % (hereafter called the second addition water) was used. In the cooling solution 150 thus configured, the behavior of liquid glass droplet 10 after being cooled until turning into glass droplet 101 is nearly same as in the fifth experiment, and the description is omitted.

As the first solution 151 of the cooling solution 150 for the second comparative experiment, water containing 0.02 wt % of nonionic surfactant (hereafter called the third addition water) was used. The behavior of the liquid glass droplet 10 after cooling until turning into glass bead 101, observed by using the cooling solution 150, s almost same as in the first comparative experiment of the second exemplary embodiment, and the description is omitted.

As the first solution 151 of the cooling solution 150 for the third experiment, water containing no nonionic surfactant was used. Namely, the composition is same as in the first experiment of the second exemplary embodiment, but there is a difference that the solution temperature is 50° C.

Regarding the fifth experiment, the sixth experiment, the second comparative experiment, and the third comparative experiment, 280 pieces of glass beads were prepared to observe the sphericity and surfaces. The sphericity measuring method and the surface observing method are same as in the second exemplary embodiment. The results are shown in Table 3.

TABLE 3

| | First solution | Second solution | Sphericity (%) | Results of surface observation |
|---|---|---|---|---|
| Fifth experiment | First addition water | First gelatinized starch solution | 98.7–99.8 | Fissure, crack, vacuum bubble rate: <1% |
| Sixth experiment | Second addition water | First gelatinized starch solution | 98.5–99.4 | Fissure, crack, vacuum bubble rate: <2% |
| Second comparative experiment | Third addition water | First gelatinized starch solution | 97.4–98.9 | Fissure, crack, vacuum bubble rate: ~10% |
| Third comparative experiment | Water | First gelatinized starch solution | 97.5–99.1 | Fissure, crack, vacuum bubble rate: 100% |

As is obvious from Table 3, in the surface observation results of glass bead 101, the defect generation rate is related with the concentration of nonionic surfactant added into the first solution 151. Particularly in the fifth experiment using the first addition water of which the concentration of nonionic surfactant is 0.01 wt %, the defect generation rate tends to increase irrespective of the concentration. In the case of the third comparative experiment using water as the first solution 151 to which no surfactant is added, vacuum bubbles are greatly produced and the defect generation rate is 100% nearly the same as the results (see Table 2) obtained with the temperature of cooling solution 150 set to 55° C. Consequently, it is desirable to set the additive concentration to 0.001 w % or over.

Also, when the additive concentration is 0.02 wt %, the defect generation rate is about 10%, resulting in exceeding 5% that is the allowable limit value. The reasons for this are as follows. The concentration of surfactant being 0.02 wt % or over gives rise to reaction between the gelatinized starch and the surfactant, thereby causing the bond of gelatinized starch molecules to be easily broken. As a result, even when the liquid glass droplet 10 with bubble layer 20 and coat 23 formed therearound comes up into the first solution, the coat 23 is lowered in starch strength, reacting with the surfactant, then the coat 23 becomes liable to collapse. Consequently, fine bubbles from the bubble layer 20 easily pass through the coat 23, causing the bubble layer 20 to be reduced in size. Judging from such phenomenon, it can be predicted that defects including vacuum bubbles in particular are generated as the surface layer of liquid glass droplet 10 is rapidly cooled.

On the other hand, when the surfactant concentration is in a range from 0.001 wt % to 0.01 wt %, since the concentration of the surfactant is appropriate, the coat 23 effectively acts to maintain the stable status. That is, even when the liquid glass droplet 10 covered with the bubble layer 20 and the coat 23 again comes up into the first solution 151, the coat 23 is hard to collapse due to the action of the surfactant, and the stable status of the bubble layer 20 is maintained. As a result, the liquid glass droplet 10 with buoyancy acted thereon may float in the first solution 151 for a little more than 10 seconds while repeating slight up-and-down motions. It can be considered that since the liquid glass droplet 10 rotates while floating, it becomes more spherical due to the centrifugal force derived from rotation and the surface tension of liquid glass droplet 10, thereby causing the sphericity to be improved. From these results, it has been found that the additive concentration of surfactant is desirable to be in a range from 0.001 wt % to 0.01 wt %.

Fifth Exemplary Embodiment

In the composition of cooling solution 150 being same as for the fifth experiment of the fourth exemplary embodiment, the influences with the temperature varied were examined. Under the three conditions of 45° C., 50° C. An 60° C. as the temperature of cooling solution 150, 280 pieces of glass beads were prepared to execute the evaluation same as in the fourth exemplary embodiment.

When the temperature of cooling solution 150 is 45° C., some liquid glass droplet 10 makes bumping noise simultaneously when dripped into the first addition water that is the first solution 151, and some makes bumping noise when the coat 23 is collapsed as the droplet again comes up into the first addition water from the first gelatinized starch solution that is the second solution 152. Thus, the behavior of the liquid glass droplet 10 is variable and unstable. The sphericity of glass bead 101 produced under such conditions ranges from 97.1% to 98.2%, and the defect generation rate as a result of surface observation is 58%.

This is because the temperature of cooling solution 150 being 45° C. is too low, and even when the liquid glass droplet 10 comes into contact with the first addition water, the bubble layer generated is insufficient, then the first addition water and the liquid glass droplet 10 become easier to directly contact with each other. As a result, only the surface portion of the liquid glass droplet 10 is rapidly cooled, making bumping noise, and vacuum bubbles are generated in the liquid glass droplet 10.

When the temperature of cooling solution 150 is 60° C., the behavior of the liquid glass droplet 10 in the cooling solution 150 is nearly the same as in the fifth experiment of the fourth exemplary embodiment. The sphericity of glass bead 101 produced under this condition is 98.5% to 99.6%. Also, the defect generation rate is less than 1%. From these results, it has been found that when water containing surfactant is used as the first solution 151, it is desirable to set the temperature of the first solution 151 of the cooling solution 150 to 50° C. or over. As to the upper limit of the temperature, there is no requirement provided that the temperature is enough to stabilize the cooling solution 150. For example, when water containing surfactant is used as the first solution 151, it is desirable to set the temperature to 100° C., i.e. the boiling point of water, or lower.

In the fourth exemplary embodiment and the fifth exemplary embodiment, the case of using gelatinized starch solution as the second solution 152 and surfactant contained water as the first solution 151 is described, but the present invention is not limited to this configuration. For example, it may be desirable to use the cooling solution 150 which uses synthetic paste mainly containing polyvinyl alcohol as the second solution 152 and surfactant water as the first solution 151. Also in the case of this cooling solution 150, glass beads with excellent sphericity and a lower rate of defect generation can be obtained. Also, as the surfactant added into the water used as the first solution, it is desirable to use nonionic surfactant, cationic surfactant, anionic surfactant or amphoteric surfactant. However, nonionic surfactant being excellent in stability is the preferred material for mass-production of glass beads.

The present invention is not limited to the contents described in the second through fifth exemplary embodiments. For example, it may be desirable to use oil as the cooling solution, making the region with which the liquid glass droplet first comes into contact lower in viscosity and the oil at the lower portion thereof higher in viscosity.

Also, setting the level of the first solution in accordance with the amount of the liquid glass droplet per droplet dripped so that the liquid glass droplet falls into the second solution before disappearance of the bubble layer generated around the liquid glass droplet coming in contact with the first solution may be desirable. The bubble layer generated around the liquid glass droplet can be covered with a coat having the composition of the second solution, thereby making it possible to stabilize the bubble layer. For example, when the amount of liquid glass droplet is 60 mg, the diameter of glass bead is about 3 mm, and in the case of using water as the first solution, it is desirable to set the solution level to be 3 times to 20 times the diameter of the glass bead.

INDUSTRIAL APPLICABILITY

As described above, as compared with the conventional glass bead producing method and apparatus, glass beads which are higher in sphericity and lower in generation rate of deflects such as crack and vacuum bubbles can be produced by a structurally simple apparatus and method. By using the glass beads, it is possible to execute hot mold press-forming without polishing an to manufacture inexpensive lenses with excellent shape accuracy.

The invention claimed is:

1. A method for producing a glass bead comprising:
dripping a liquid glass droplet from a nozzle into a cooling solution, and
covering the liquid glass droplet with a bubble layer generated by vaporizing the cooling solution, cooling the liquid glass droplet in the cooling solution and reducing falling speed of the liquid droplet during a period when the liquid glass droplet is cooled down to a temperature lower than a glass transfer temperature of the glass in the cooling solution,
wherein the cooling solution comprises one of a gelatinized starch solution and a synthetic paste solution.

2. A method for producing a glass bead comprising:
dripping a liquid glass droplet from a nozzle into a cooling solution, and
covering the liquid glass droplet with a bubble layer generated by vaporizing the cooling solution and with a coat formed around the bubble layer by a composition of the cooling solution, cooling the liquid glass droplet in the cooling solution and reducing falling speed of the liquid droplet during a period when the liquid glass droplet is cooled down to a temperature lower than a glass transfer temperature of the glass in the cooling solution,
wherein the cooling solution comprises one of a gelatinized starch solution and a synthetic paste solution.

3. The method for producing a glass bead of claim 1 or 2, wherein a surface portion of the cooling solution where the liquid glass droplet comes into contact with the cooling solution is lower in viscosity as compared with a lower portion thereof.

4. The method for producing a glass bead of claim 1 or 2, wherein a noncombustible solution is used for a surface portion of the cooling solution with which the liquid glass droplet comes into contact.

5. The method for producing a glass bead of claim 3, wherein the cooling solution is gelatinized starch solution, a concentration of the lower portion of the cooling solution is such that an amount of gelatinized starch is in a range from 20 g to 40 g per 1,000 cc of water, and a concentration of the surface portion of the cooling solution is such that the amount of the gelatinized starch is less than 20 g per 1,000 cc of water.

6. The method for producing a glass bead of claim 5, wherein a solution with potato starch dissolved in water and gelatinized is used as the gelatinized starch solution.

7. The method for producing a glass bead of claim 1, wherein oil is used as the cooling solution, and a surface portion of the cooling solution where the liquid glass droplet comes into contact with the oil is lower in viscosity as compared with a lower portion thereof.

8. The method for producing a glass bead of claim 1 or 2, wherein the cooling solution is formed of two layers, a surface portion and a lower portion, the surface portion, with which the liquid glass droplet comes into contact, is a first solution and the lower portion, which is disposed under the first solution, is a second solution.

9. The method for producing a glass bead of claim 8, wherein the cooling solution includes water as the first solution, and one of a gelatinized starch solution and a synthetic paste solution as the second solution.

10. The method for producing a glass bead of claim 9, wherein the gelatinized starch solution is the second solution of the cooling solution, and a concentration of gelatinized starch solution is such that an amount of gelatinized starch is in a range from 20 g to 40 g per 1,000 cc of water.

11. The method for producing a glass bead of claim 10, wherein a solution with potato starch dissolved in water and gelatinized is used as the gelatinized starch solution.

12. The method for producing a glass bead of claim 1 or 2, wherein a temperature of a surface portion of the cooling solution where the liquid glass droplet first comes into contact with the cooling solution is 60° C. or higher, and lower than a boiling point of the cooling solution.

13. The method for producing a glass bead of claim 1, wherein the cooling solution includes surfactant.

14. The method for producing a glass bead of claim 2, wherein the cooling solution contains surfactant.

15. The method for producing a glass bead of claim 8, wherein the first solution of the cooling solution is water including surfactant, and the second solution thereof is one of a gelatinized starch solution and a synthetic paste solution.

16. The method for producing a glass bead of claim 13 or 14, wherein a temperature of a surface portion of the cooling solution where the liquid glass droplet comes into contact with the cooling solution is 50° C. or higher, and lower than a boiling point of the cooling solution.

17. The method for producing a glass bead of claim 13 or 14, wherein a concentration of the surfactant is in a range from 0.001 wt % to 0.01 wt %.

18. The method for producing a glass bead of claim 13 or 14, wherein nonionic surfactant is used as the surfactant.

19. The method for producing a glass bead of claim 1 or 2, wherein the liquid glass droplet is dripped in a vertical direction to a surface of the cooling solution.

20. The method for producing a glass bead of claim 8, wherein a level of the first solution is set in accordance with an amount of the liquid glass droplet dripped so that the liquid glass droplet is dripped into the second solution before disappearance of the bubble layer generated by contacting the liquid glass droplet with the first solution.

21. The method for producing a glass bead of claim 15, wherein a temperature of a surface portion of the cooling solution where the liquid glass droplet first comes into contact with the cooling solution is 50° C. or higher, and lower than a boiling point of the cooling solution.

22. The method for producing a glass bead of claim 15, wherein a concentration of the surfactant is in a range from 0.001 wt % to 0.01 wt %.

23. The method for producing a glass bead of claim 15, wherein nonionic surfactant is used as the surfactant.

* * * * *